(12) United States Patent
Steeby et al.

(10) Patent No.: US 6,352,492 B1
(45) Date of Patent: Mar. 5, 2002

(54) TORQUE MODULATION SHIFT CONTROL SYSTEM AND METHOD

(75) Inventors: Jon A. Steeby, Schoolcraft; Warren R. Dedow; Mark A. Boardman, both of Portage, all of MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/543,927

(22) Filed: Apr. 6, 2000

(51) Int. Cl.[7] .............................................. B60K 41/04
(52) U.S. Cl. ....................................................... 477/109
(58) Field of Search .......................................... 477/109

(56) References Cited

U.S. PATENT DOCUMENTS

| | | | |
|---|---|---|---|
| 4,850,236 A | 7/1989 | Braun | 74/337 |
| 5,571,059 A | 11/1996 | Desautels et al. | 477/111 |
| 5,573,477 A | 11/1996 | Desautels et al. | 477/109 |
| 5,582,558 A | 12/1996 | Palmeri et al. | 477/109 |
| 5,853,306 A | * 12/1998 | Worth et al. | 477/109 |
| 5,980,424 A | 11/1999 | Huber et al. | 477/109 |

* cited by examiner

*Primary Examiner*—Dirk Wright
(74) *Attorney, Agent, or Firm*—Rader, Fishman & Grauer PLLC

(57) ABSTRACT

A shift control system is provided that is suitable for semi-automatic transmissions in heavy duty vehicles. The torque modulation system includes logic circuitry that employs a ramping torque function or algorithm to control the acceleration of torque, both positive and negative, and/or provides a longer dwell time in the torque clutch disengagement range. Moreover, dwell time at peak is not required. A method for improving gear disengagement and shift control in accordance with the principles of the invention is also disclosed.

22 Claims, 3 Drawing Sheets

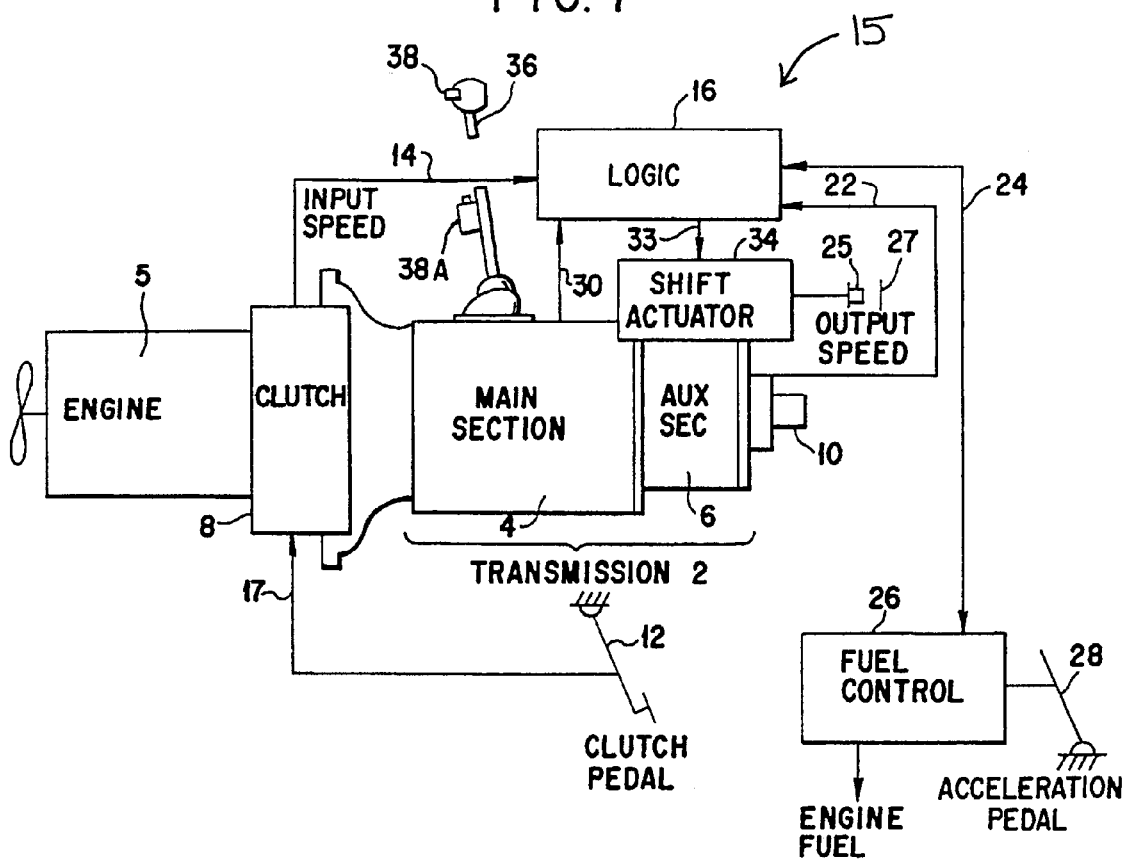

TORQUE MODULATION SHIFT CONTROL SYSTEM AND METHOD

FIELD OF THE INVENTION

The present invention relates generally to a shift control system for vehicular drive lines and more particularly to a semi-automatic shift control system suitable for heavy duty trucks that utilizes torque modulation to improve gear disengagement and shift control. The present invention also includes a method for improving gear disengagement and shift control.

BACKGROUND OF THE INVENTION

Vehicle transmissions are well known in the art. Heavy duty vehicles typically include a manual or a semi-automatic transmission. The basic principal behind such semi-automatic transmissions is to assist a driver in performing a manually selected gear ratio change using a system that is at least partially automated. While such transmissions are becoming more prevalent, those skilled in the art continue to attempt to improve or enhance current designs.

To effect a gear change or shift in vehicles with a conventional manual transmission, the driver manually operates a clutch and a gear shift lever. The master clutch disengages the output shaft of the engine from the input shaft of the transmission so that the transmission is moved out of engagement with a pre-selected gear and into a neutral position. The master clutch is then released to allow the internal rotating members of the transmission to maintain their rotational speed and approximates a desired engine speed via the engine throttle that corresponds to an appropriate synchronized speed for engaging the new gear. Then, to re-engage the transmission into a new pre-selected gear, the driver operates the master clutch and moves the shift lever. This requires both skill and experience.

Semi-automatic shift control enables automatic shifting between higher sequentially related forward gear ratios. A controller causes the engine fuel supply to be increased and decreased, possibly repeatedly, while actuators urge the existing engaged jaw clutch assembly toward disengagement to create a torque break sufficient for disengagement. However, engine acceleration and deceleration rates with some engines are significantly fast enough to cause jaw clutches to sometimes remain locked during electronically controlled torque reversals that facilitate disengagement. Some known fuel control systems "blip" torque positive and "negative" in percentage increments and then hold the same for a given duration of time, in the manner similar to a step function, and then may increase as necessary to achieve disengagement. Negative torque may be induced by commanding zero fuel to the engine, allowing natural engine friction to provide the "negative" torque reversal to the system.

A challenge that designers of semi-automatic transmission systems face is to improve or simplify the task of shifting gears and to do so in an efficient and effective manner that appears seamless to the driver. This invention provides an effective system and method for improving gear disengagement and shifting.

SUMMARY OF THE INVENTION

The present invention recognizes the aforementioned challenges and the limitations associated with conventional systems and methods and provides a torque modulation shift control system and method that improves gear disengagement in a cost-effective and efficient manner that appears seamless to the driver.

The present invention provides the additional advantage of being achievable with software modification. Hence, the system and method is quite economical when compared with conventional systems and methods.

In accordance with an embodiment of the invention, a shift control system is provided that is suitable for semi-automatic transmissions in heavy duty vehicles. The torque modulation system includes logic circuitry that may employ a torque function or algorithm to control the rate of change of torque, both positive and negative, and may provide for longer dwell time in the torque clutch disengagement range. Further, the dithering torque that is commanded by the system can, by way of example and without limitation, reduce momentary peak torque values from ±14% to ±10%, or less, using J1939 torque values over a datalink. The purpose of such dithering torque is to help ensure that "zero torque" will be achieved in a relatively brief span of time even if the engine torque information is over or underreported to the system. Moreover, dwell time at maximum or minimum peak torque, which provides little or no functional benefit to disengagement and shifting, is not required. A method for improving gear disengagement and shift control in accordance with the principles of the invention is also disclosed.

BRIEF DESCRIPTIONS OF THE DRAWINGS

The features and inventive aspects of the present invention will become more apparent upon reading the following detailed description, claims, and drawings, of which the following is a brief description:

DETAILED DESCRIPTION OF PREFERRED EMBODIMENT

Figure 1:
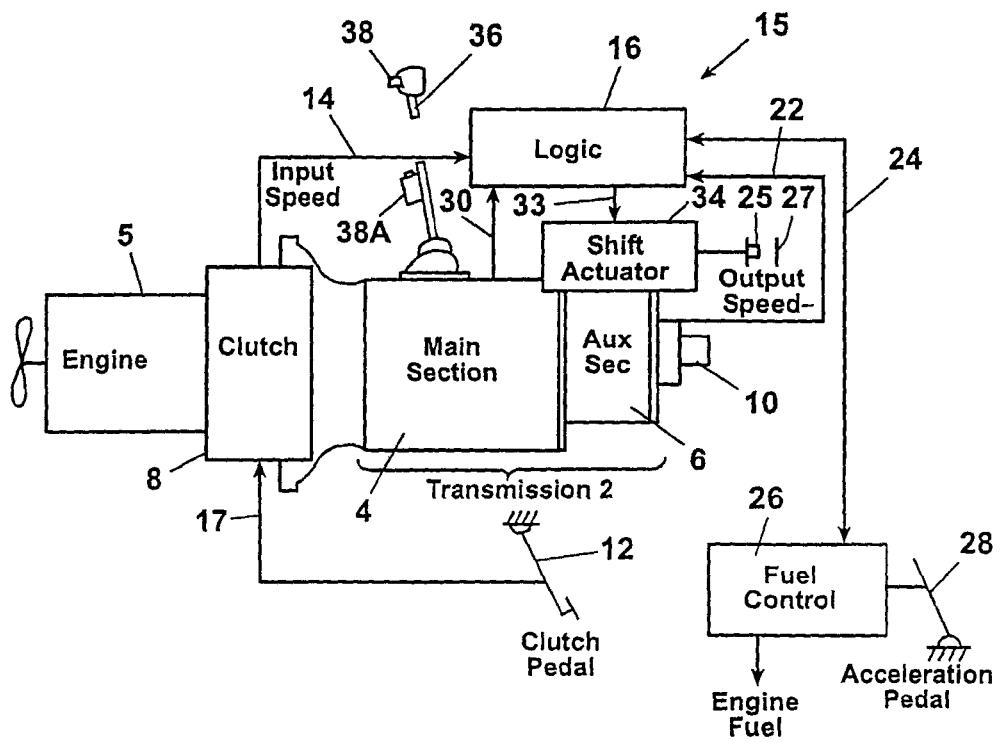
FIG. 1 shows a block diagram of a semi-automatic compound transmission.
Figure 2:
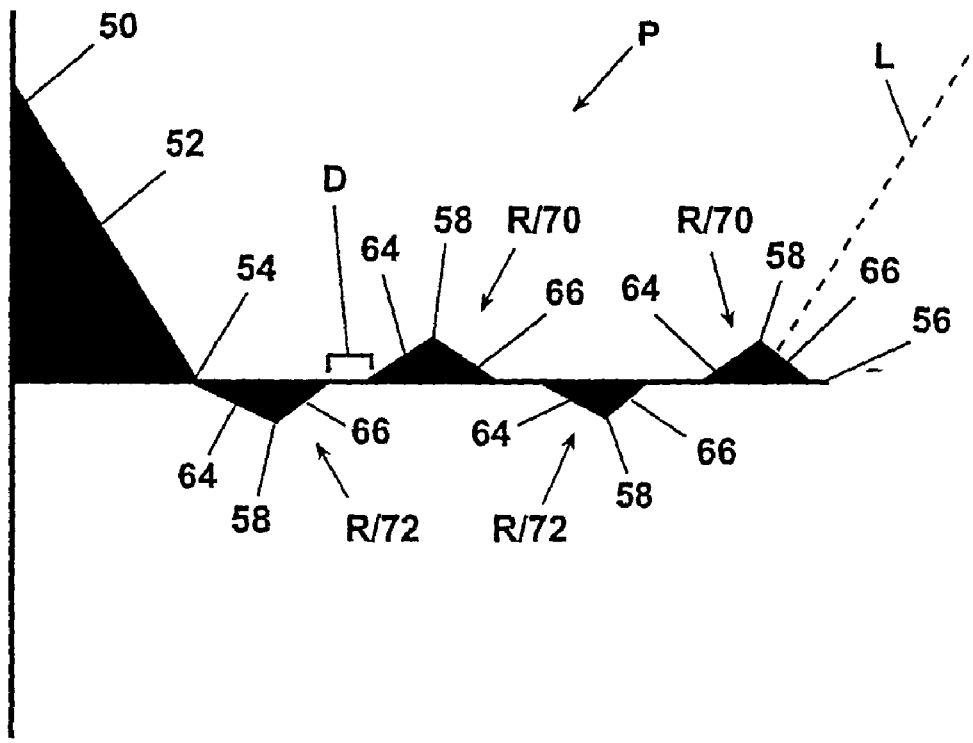
Figure 3:
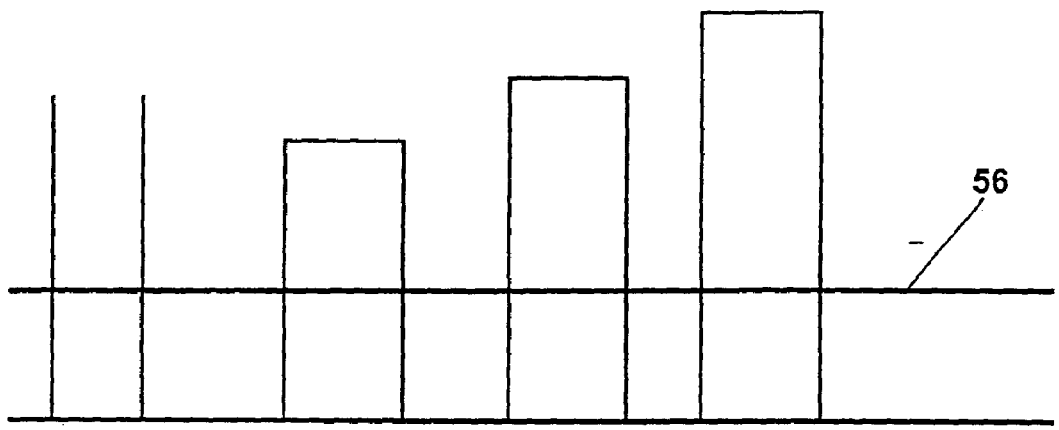

FIG. 1 schematically and diagrammatically illustrates a type of compound mechanical vehicle transmission system commonly used with heavy duty trucks. In the embodiment of the transmission system illustrated, a main section 4 is coupled in series to an auxiliary section 6 controlled by a shift control system 15. The shift control system 15 includes a means for sensing and providing a suitable signal 33 to an actuator means 34 that is operative to enable automatic shifting at the particular gear position desired.

The system 15 further includes a means operative to enable automatic shifting, preferably an electronic controller 16, a fuel control means 26 and a shift actuator 34. Main section 4 is operatively coupled to the drive shaft of the vehicle engine 5 by master friction clutch 8. The engine 5 provides a motive force to propel the vehicle via the transmission 2. Output shaft 10 of auxiliary section 6 is operatively coupled—typically by means of a drive shaft and drive axle—to the drive wheels of the vehicle (not shown). Moreover, a multiple speed drive axle can be substituted for, or used in connection with, auxiliary section 6. However, it is important to note that, although a representative transmission system is shown in FIG. 1, the present invention is not limited to that configuration.

The change gear ratios available from transmission 2 are generally manually selectable by first depressing a clutch pedal 12 to disengage the engine drive shaft and then positioning a shift lever 36 according to the shift pattern prescribed to engage the desired change gear ratio of main section 4. In the event the desired gear ratio is contained within auxiliary section 6, shifting can be facilitated by operation of one or more actuators such as electrical shift button 38 or fluid actuating valve 38A to provide a signal operative to effect the engagement within auxiliary section 6. Such systems are commonly known to those skilled in the design and operation of compound type transmissions.

The term "group" as used herein means the particular plurality of gear ratios available from a vehicular transmission, for example, a compound type transmission in which an operator manually selects a particular gear ratio. The term "sequentially related" as used herein shall mean between gear ratios available within the group selected provided there is no intervening gear ratio available within another group. Commonly, transmission 2 is of the type having a plurality of forward gear ratios of which one group selectable by the operator is sequentially related and less than the total number of gear ratios provided by the transmission and automatic shifting is effected between at least two of the sequentially related gear ratios.

Preferably, all of the gear ratios except the highest and those sequentially related to the highest in the group including the highest gear ratio are manually selectable by the operator by depressing clutch pedal 12 to cause clutch 8 to disengage transmission 2 from the engine drive member to allow lever 36 to move to the neutral position, then to re-engage clutch 8 and manipulate fuel to engine 5 to cause synchronous or substantially synchronous rotation of the clutch members of the jaw clutch selected to be engaged and then to again disengage clutch 8 and then position shift lever 36, and actuate button 38 if required, and thence, upon engagement of the desired change gear ratio, release pedal 12.

Typically, the control system includes a means for sensing and providing a suitable signal 33 to actuator means 34, which is operative to enable automatic shifting at the particular gear position desired; an electronic controller 16 for providing semi-automatic control which may include logic circuitry (preferably microprocessor based); a fuel control means 26 and a shift actuator 34. The controller 16 can be realized, by one or more microcomputers, custom designed microcontrollers, software, dedicated circuitry, or a combination of one or more of the foregoing. Typically, the controller 16 is operative to receive and operate upon information including an input shaft speed signal 14, a gear ratio position signal 30, an output shaft speed signal 22, and/or an input signal 24 indicative of accelerator pedal position 28 and gear disengagement to initiate and provide automatic shifting.

Generally, automatic shifting is accomplished by shift actuator 34 including valves and the like well known to those skilled in the art according to the nature of a command output signal 33 received from logic circuitry 16 and by automatic fuel control 26 according to the command output signal 24. In conventional systems, the controller 16 may control the engine 5 by controlling the amount of fuel supplied to the engine 5 through the fuel control 26. Controlling the amount of fuel supplied to the engine 5 controls the rotational speed of the engine output shaft and provides automatic torque control. Further, a plurality of sensors can provide information regarding gear placement and ratios within the transmission system.

The transmission system preferably is used to allow an operator to accomplish a desired gear change without requiring the operator to operate the clutch 8. This is generally accomplished by controlling the rotational speed of the engine 5, and more specifically, the output shaft, using the controller 16, to achieve a zero torque condition within the transmission. A zero torque condition allows the operator to manipulate the shift lever 36 to disengage a currently engaged gear. The assembly and method of the present invention provides an improved method for effectively and efficiently achieving the necessary zero torque condition within the transmission.

In some conventional systems, the actuator 34 will urge clutch members (e.g., first and second clutch members) axially apart. The rotational speed of a second clutch member and gear are dependent upon the speed of the vehicle, which during a typical shift transient, is substantially constant. The engine 5 is momentarily given additional fuel to increase the rotational speed thereby causing a first clutch member to drive a second clutch member, then the fuel is decreased to slow the engine whereby the second clutch member will drive the first clutch member. During the forced torque reversal, there will be, for at least an instant, a break in torque transfer across the first and second clutch members allowing disengagement. This is sensed where a decision is made to proceed with the control sequence only once this disengagement occurs.

After the first and second clutch members are disengaged and the disengagement is verified, the fuel to the engine 5 is controlled by the fuel control 26 to cause the clutch to rotate at a substantially synchronous speed. Upon achieving substantially synchronous conditions, which may be sensed by signals (such as 14 and 22 depicted in FIG. 1), a control causes the shift actuator 34 to bring the clutch into positive engagement.

A means for controlling engine and vehicular ground speed about a desired value, commonly referred to as "cruise control," may be included independently or in conjunction with the shift control system and may be incorporated as part of the fuel control 26. Additionally, there may be situations where it is desired to manually shift amongst all of the gear ratios and, for such reason, the shift control system preferably includes means for rendering the control system inoperative when desired by an event such as actuation of a switch 25 by the operator (shown in FIG. 1) or by some other event such as a signal operable to control system. The means for rendering the control system inoperative preferably also includes a means indicating that conversion to manual shifting has been actuated for purposes of a record such as, for example, by having to break or displace a seal 27 or other type of barrier (as shown in FIG. 1) to effect the disengagement of the shift control system.

Figure 2:
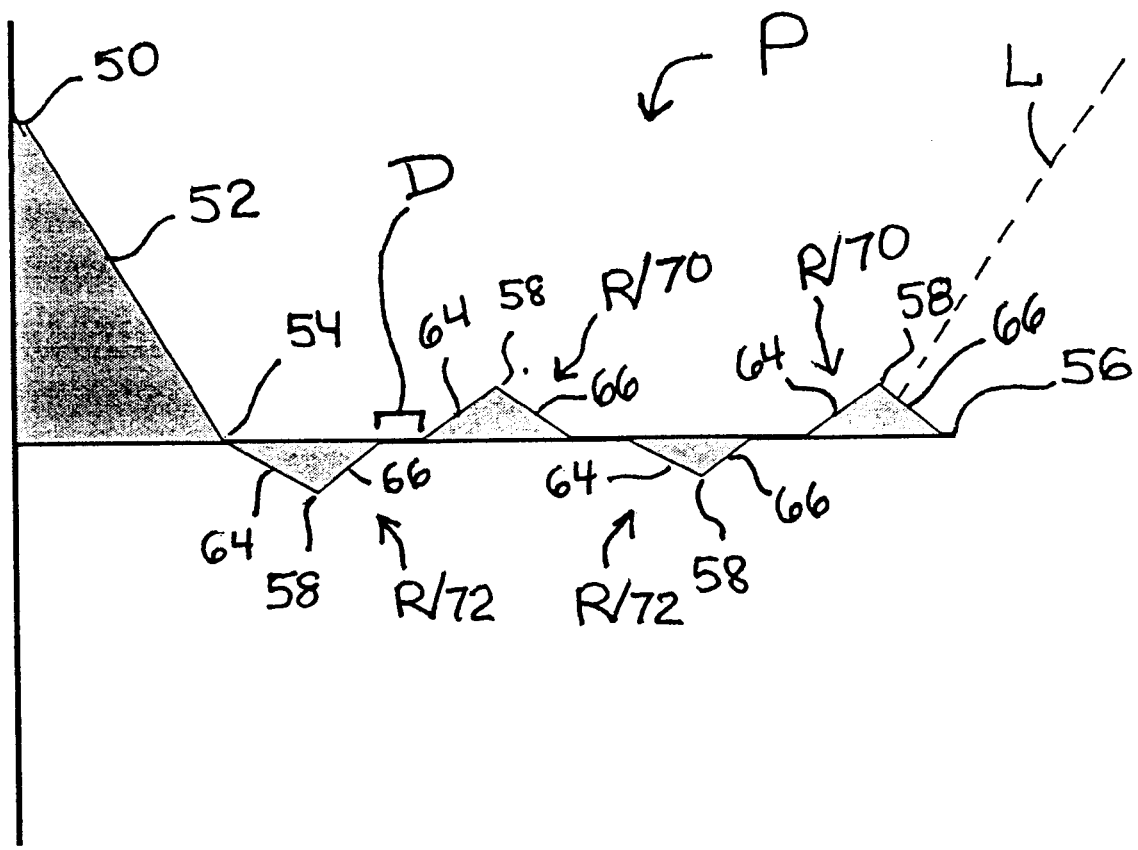
FIG. 2 is graphic illustration of an implementation of a method of this invention.

FIG. 2 illustrates an implementation of the present invention and includes a plot P of torque value versus time. When a vehicle is engaged in a gear, for example, there is an initial torque value 50 of available engine torque at the beginning of a desired shift. The controller 16 has information that indicates the conditions necessary to obtain a zero torque condition relative to the currently engaged gear. Such conditions may include, but are not limited to signals 14, 22 and 24. The controller 16 causes the current torque value to descend as illustrated at 52 until it reaches a point 54 where the current torque value equals a target torque value 56. The target torque value 56 is a value of torque that corresponds to having a zero torque condition internal to the transmission and not necessarily the torque output of the engine, thereby permitting the operator to disengage the currently engaged gear. The descent from the initial torque value 50 to the point 54 preferably has a substantially constant decreasing rate or slope (torque per time) that passes through point 52. However, a constant decrease is not critical, and non-constant, non-linear rates are within the scope of the present invention. With heavy duty vehicle transmissions, a slow decreasing rate is useful. A ramped modulation of the torque has been found to provide a smoother transition and better performance than the step functions that are often associated with conventional transmission control systems. Line L visually represents the increase in torque over time that follows the disengagement of one gear and the initial ramp up of torque associated with a subsequent gear.

Figure 3:
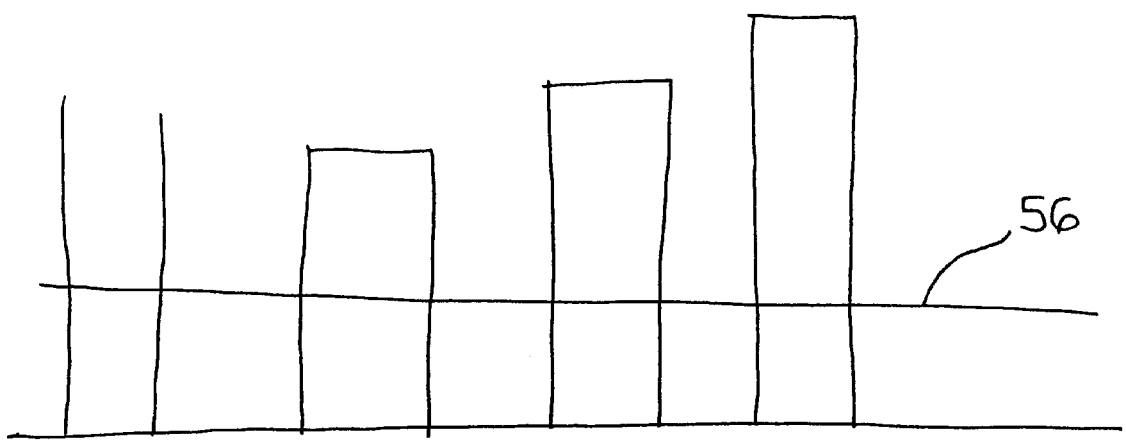
FIG. 3 is graphic illustration of a conventional method of dithering torque values to facilitate disengagement.

FIG. 3 represents a conventional chart of modulated torque versus time. The chart illustrates a type of torque dithering in the form of a step function about a zero torque line 56. In the embodiment shown, the magnitude of torque is increased with each sequential step until disengagement is achieved.

Achieving ramped modulated torque control is accomplished by the controller 16, which may utilize one or more algorithms associated with different functional environments. The torque value is preferably controlled by a modulation algorithm that "filters" or modifies the electronic signals that dictate the current torque value. The algorithm or filter has a value that may be determined based on an overall gear ratio of the transmission.

As the current torque value reaches the point 54 where it crosses the estimated zero torque line 56, a modulation function, preferably a ramp function, is implemented to vary the current torque value about the target torque value 56. In general, the amplitude and period are lower for lower gears, and higher for higher gear ratios.

A preferred embodiment of the present invention utilizes individual ramps R in connection with a torque modulation model or algorithm to control the acceleration of torque, both positive and negative, with respect to the zero torque line 56. The zero torque line 56 is the level or magnitude of torque that the system determines to be the expected optimum torque for disengagement. The algorithm modulates the torque about the zero torque line to account for any discrepancies that may occur in the system, for instance, when an engine is cold, or may change the zero torque condition based on such factors.

The ramp R preferably has a steady, linear rate of torque acceleration and deceleration, but non-linear rates, such as parabolic, semicircular, and exponential rates, are also contemplated. The ramp rate from the zero torque range 56 to an apex 58 (i.e., a temporary maximum torque value generally governed by a control algorithm and the controller 16), also referred to as a "ramp up," is generally illustrated as 64 and the ramp rate from the apex 58 back to the zero torque range 56, also referred to as a "ramp down," is generally illustrated as 66. There is usually little value in holding or maintaining the controlled torque value at an apex 58, so the value is generally and preferably quickly ramped down back toward the expected zero torque line 56.

In a preferred embodiment of the present invention, the span of each ramp is approximately 75 ms (for example, but may vary with either engine or transmission types) with a magnitude range of ±5% of the magnitude at the start of the shift event. At the apex 58, either torque or time out is achieved. The modulation of torque associated with the present invention preferably includes dwell time D between one or more alternating positive and negative ramps. The dwell time D provides a span of additional time between ramps—without significant torque modification—that permits the torque controlled by the engine to catch up with the algorithm and allows the torque value to hold in what the controller 16 perceives to be the prime range for disengagement. In a preferred embodiment of the present invention the dwell time D will be in the order of about 100 ms. This type of modulation provides longer dwell in the torque jaw-clutch disengagement range, and typically allows the torque commanded to be narrowed. Dwell time at peak torque is not required because there is little or no value in holding or maintaining a peak value of torque.

In a preferred embodiment, the ramp up 64 and ramp down 66 rates for an individual ramp R will be approximately the same. Likewise, the magnitudes of alternating positive ramps 70 and negative ramps 72 often have similar torque magnitude values. However, in a further embodiment of the present invention, the system may provide torque ramps R that have increasing torque value magnitudes as time progresses if disengagement is not achieved.

The present invention utilizes real time torque control algorithms to provide a longer period of torque disengagement for more "seamless" gear disengagement. Because it is electronically-based, the ramp up and ramp down rates for individual ramps R can be readily adjusted and jointly and/or independently optimized for different vehicle transmission environments via simple control algorithms and/or programming in an efficient and economical manner.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variations and modifications are within its spirit and the scope as defined by the claims.

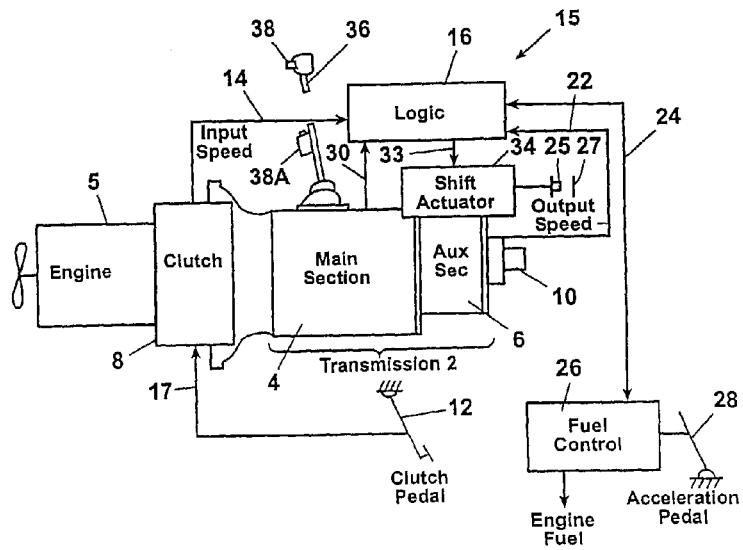

What is claimed is:

1. A shift control system for a vehicular drive train having a plurality of groups of gears with each of said groups having at least one gear manually selectable by an operator and including a plurality of sequentially related gears, said drive train including a torque-producing device, an actuator for enabling automatic shifting at the particular gear position desired and logic circuitry that employs a ramping function to control the acceleration of torque to provide improved gear disengagement, and wherein the ramping function is capable of controlling both positive and negative torque acceleration.

2. A system as recited in claim 1, wherein the ramping function controls the acceleration of both positive and negative torque.

3. A system as recited in claim 1, wherein the ramping function includes a plurality of individual ramps having a ramp rate up, an apex, and a ramp rate down.

4. A system as recited in claim 3, wherein at the apex of the individual ramp, either a requisite torque value for disengagement is acheived or the torque is ramped down.

5. A system as recited in claim 3, wherein the ramp rate up of an individual ramp is substantially the same as the ramp rate down for said individual ramp.

6. A system as recited in claim 1, wherein the magnitude of the torque for an individual ramp is within the range of about ±5% of the magnitude of the total available engine torque at the start of the event of disengagement.

7. A system as recited in claim 1, wherein dwell time is included between sequentially successive individual ramps.

8. A system as recited in claim 1, wherein dwell time is included between alternating positive and negative sequentially successive individual ramps.

9. A system as recited in claim 1, wherein dwell time is calculated in the zero torque range.

10. A system as recited in claim 8, wherein the dwell time is approximately 100 ms.

11. A system as recited in claim 1, wherein the system does not include dwell time at the peak torque at the start of an event of gear disengagement.

12. A system as recited in claim 1, wherein the magnitude of the individual torque ramps may be increased as time progresses if disengagement is not achieved.

13. A system as recited in claim 1, including at least one sensor for sensing gear disengagement.

14. A shift control system for a vehicular drive train having a plurality of groups of gears with each of said groups having at least one gear manually selectable by an operator and including a plurality of sequentially related gears, said drive train including an actuator for enabling automatic shifting at the particular gear position desired and logic circuitry that employs a dwell time between sequentially successive functions of torque controlled by the logic circuitry to provide improved gear disengagement.

15. A system as recited in claim 14, wherein the dwell time is included between alternating positive and negative sequentially successive functions of torque that are controlled by the logic circuitry.

16. A method for controlling torque value in a vehicle transmission having multiple gears, including the steps of:

determining a zero torque value;

determining an initial current torque value that is indicative of the current transmission condition;

changing the current torque value by manipulating a signal that is used for adjusting an engine variable so that the current torque value approaches the zero torque value; and utilizing logic circuitry to employ a function to ramp the current torque value up and down in the form of an individual ramp as a function of time having a determined amplitude and period by adjusting an engine variable until a known transmission condition exists.

17. A method as recited in claim 16, wherein a plurality of ramps control the acceleration of positive and negative torque.

18. A method as recited in claim 17, wherein a dwell time is included between sequentially successive individual ramps.

19. A method as recited in claim 17, wherein ramps controlling positive and negative torque are alternated.

20. A method as recited in claim 17, wherein the magnitude of ramped torque values is increased as time progresses if disengagement of a gear is not achieved.

21. A method as recited in claim 17, including the step of modifying the ramp function for different vehicle transmission environments.

22. A method as recited in claim 21, wherein an algorithm is used to modify the ramp function to optimize the configuration of an individual ramp.

* * * * *

UNITED STATES PATENT AND TRADEMARK OFFICE
CERTIFICATE OF CORRECTION

PATENT NO. : 6,352,492 B1
DATED : March 5, 2002
INVENTOR(S) : Steeby et al.

It is certified that error appears in the above-identified patent and that said Letters Patent is hereby corrected as shown below:

Delete title page and Drawing Sheets 1-3 and substitute attached title page Drawing Sheets 1-3.

Signed and Sealed this

Twenty-fifth Day of June, 2002

Attest:

Attesting Officer

JAMES E. ROGAN
Director of the United States Patent and Trademark Office

United States Patent
Steeby et al.

(10) Patent No.: US 6,352,492 B1
(45) Date of Patent: Mar. 5, 2002

(54) TORQUE MODULATION SHIFT CONTROL SYSTEM AND METHOD

(75) Inventors: Jon A. Steeby, Schoolcraft; Warren R. Dedow; Mark A. Boardman, both of Portage, all of MI (US)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 09/543,927
(22) Filed: Apr. 6, 2000
(51) Int. Cl.$^7$ ................................................ B60K 41/04
(52) U.S. Cl. ........................................................ 477/109
(58) Field of Search .......................................... 477/109

(56) References Cited

U.S. PATENT DOCUMENTS

| | | | |
|---|---|---|---|
| 4,850,236 A | 7/1989 | Braun | 74/337 |
| 5,571,059 A | 11/1996 | Desautels et al. | 477/111 |
| 5,573,477 A | 11/1996 | Desautels et al. | 477/109 |
| 5,582,558 A | 12/1996 | Palmeri et al. | 477/109 |
| 5,853,306 A | * 12/1998 | Worth et al. | 477/109 |
| 5,980,424 A | 11/1999 | Huber et al. | 477/109 |

* cited by examiner

*Primary Examiner*—Dirk Wright
(74) *Attorney, Agent, or Firm*—Rader, Fishman & Grauer PLLC

(57) ABSTRACT

A shift control system is provided that is suitable for semi-automatic transmissions in heavy duty vehicles. The torque modulation system includes logic circuitry that employs a ramping torque function or algorithm to control the acceleration of torque, both positive and negative, and/or provides a longer dwell time in the torque clutch disengagement range. Moreover, dwell time at peak is not required. A method for improving gear disengagement and shift control in accordance with the principles of the invention is also disclosed.

22 Claims, 3 Drawing Sheets